Nov. 10, 1942.                R. B. YAUCH                2,301,654
                              SEALING MEANS
                          Filed April 30, 1940
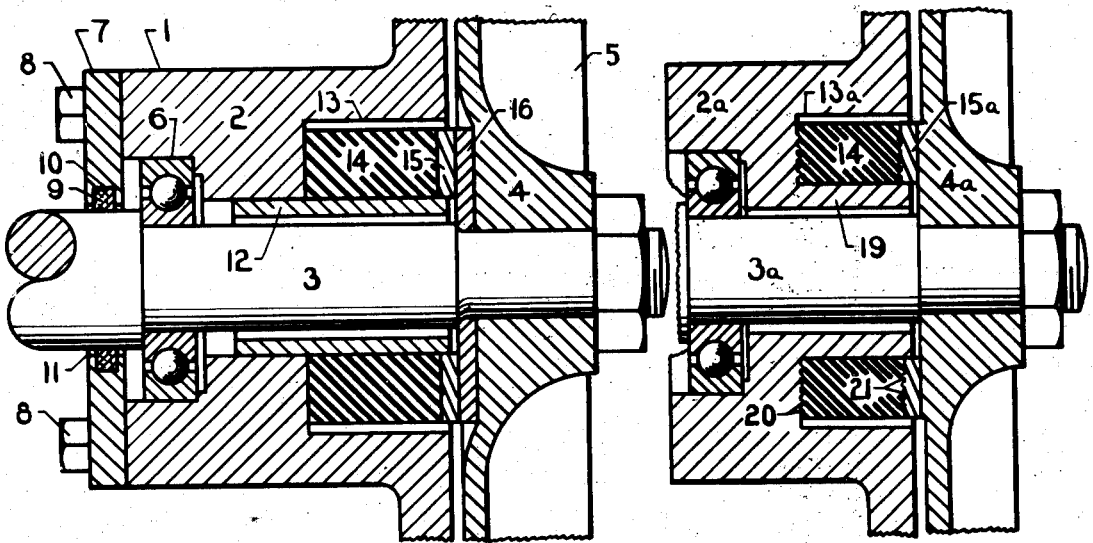
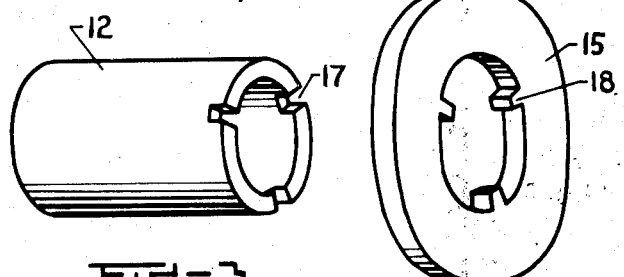
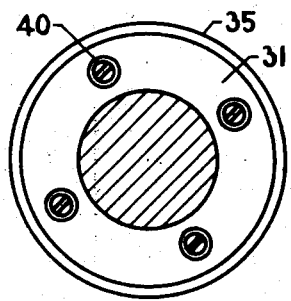
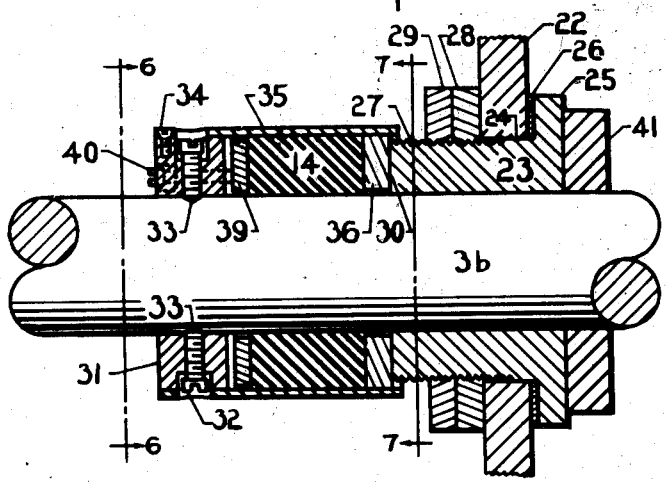
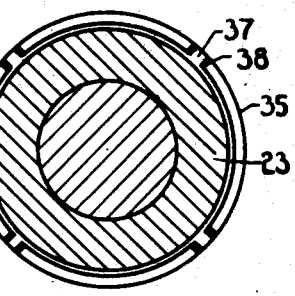
INVENTOR.
Robert B. Yauch
BY Roy A. Plant
ATTORNEY Patented Nov. 10, 1942

2,301,654

UNITED STATES PATENT OFFICE 2,301,654

SEALING MEANS

Robert B. Yauch, Battle Creek, Mich., assignor of fifty per cent to Elmer P. Harlow, Battle Creek, Mich.

Application April 30, 1940, Serial No. 332,563

1 Claim. (Cl. 286—7)

The present invention relates broadly to sealing mechanisms, and in its specific phases to seals for use in connection with rotating shafts.

The sealing of rotating shafts has been a matter which has caused a great deal of difficulty, the attempted solution of which has given risen to the use of highly complex sealing mechanisms. One of the best known seals involves the use of a conventional stuffing box with packing, and a gland for compressing same. This type of seal is unsatisfactory for many purposes, and especially so where the rotating shaft is either scored, out of round, or gyrates. Packing of this nature, as well as many others such as the spring held cup leather type, when installed in centrifugal pumps used for submerged pumping of muddy or grit carrying water, commonly wears out in a single day's operation with resultant leakage, scoring of the shaft, and wearing of the pump parts due to the scouring action of the abrasives carried by the leaking fluid.

In an attempt to overcome leakage due to gyration, seals of the bellows type have been produced. The rotational strains, as well as the flexing of the frail bellows are well recognized as being common causes of failure of this type of seal. Rotating seals involving the use of a spring projected rubber gasket have also been used with little better success than the bellows type seals even where gyration difficulties are not present. A careful consideration of these and other difficulties in the rotating shaft sealing art lead to the development of the present invention which is widely useable and meets a long felt want in this field.

Accordingly, among the objects of the present invention is the provision of a fluid sealing device for rotating shafts which effectively overcomes the above noted objections to seals or packings heretofore used or proposed.

Another object is to provide a simplified, positive acting, sealing mechanism which forms a tight seal with the shaft, even under conditions of moderate gyration of same.

A further object is to provide a seal which eliminates the use of bellows, springs, and stuffing boxes with the failure difficulties incident thereto.

A still further object is to provide a fluid sealing device for rotating shafts which can be manufactured at relatively low cost, is easy to install, and which is not subject to excessive wear due to improper bearing surfaces or unnecessarily heavy frictional contacts.

Still further objects and advantages of the present invention will be apparent as the description of the invention proceeds.

To the accomplishment of the foregoing and related ends, the invention, then, consists of the means hereinafter fully described and particularly pointed out in the claim, the annexed drawing and the following description setting forth in detail certain means for carrying out the invention, such disclosed means illustrating, however, but several of various ways in which the principle of the invention may be used.

In said annexed drawing:

Figure 1 shows a fragmentary center sectional view of a centrifugal pump embodying one form of the present invention.

Figure 2 shows a fragmentary center sectional view of a centrifugal pump embodying a modified form of the present invention.

Figure 3 is a perspective view of a notched end sleeve forming a preferred part of the assembly shown in Figure 1.

Figure 4 shows a perspective view of a washer with lugs adapted to fit the notches in the end of the sleeve shown in Figure 3.

Figure 5 is a sectional assembly view of a modified form of the sealing mechanism of the present invention.

Figure 6 is an end view of the mechanism shown in Figure 5 as viewed in the direction of the arrows 6—6.

Figure 7 is an end view of the mechanism shown in Figure 5 as viewed in the direction of the arrows 7—7.

Referring more particularly to Figure 1 of the drawing, the centrifugal pump 1 has a casing 2, only a portion of which is shown, a shaft 3, and an impeller 4 with blades 5. The shaft 3 is mounted on suitable bearings 6, only one of which is shown. This bearing 6 within casing 2 acts both to carry radial loads, and endwise thrust loads, thus stabilizing shaft 3 in an endwise direction and facilitating the operation of the improved sealing mechanism hereinafter set forth in detail. End plate 7 anchored by means of cap screws 8 to the end of casing 2 acts to protect bearing 6 from injury due to contact with large pieces of foreign matter. To further facilitate this action, a sealing ring 9, formed of cup leather material or other suitable packing may be placed in groove 10 cut in the face of circular opening 11 through which shaft 3 passes and closely fits.

In order to prevent fluid flow through the pump along shaft 3, a sealing mechanism is provided. One convenient form of this sealing combination, as shown in Figure 1, involves the use of a tubular sleeve 12 which is press fit into casing 2 of the pump. Mounted on this sleeve, for instance in a recess 13 to shorten the distance between bearing 6 and impeller 4, is a tubular resilient bushing 14 of rubber or synthetic material such as "neoprene" preferably in cylindrical form. The term "neoprene" is typical of synthetic rubber of the "polymerized chloroprene" type, and for simplicity of describing this tough and oil resistant resilient material, it will be referred to in the claims as "synthetic rubber." The particular type of resilient material used in the bushing will depend in a large measure upon the conditions of use, the fluid to be pumped, and whether grease or oil is present. For instance, if the pump is to be used for pumping gasoline, or bearing 6 is packed full of grease so that it may pass down the face of shaft 3 and reach bushing 14, then this bushing will be formed from a grease or oil impervious resilient material similar to rubber. Mounted on the end of sleeve 12 in contact with the outer end of bushing 14 is a washer 15, preferably made of oilless bronze. The face of this washer in contact with the end of bushing 14 does not need to be highly finished, and in fact, a slight roughness is desirable in obtaining a thorough seal on the end of the bushing. The opposite face of the washer, however, is preferably given a ground or polished finish. Mounted in fluid tight manner on shaft 3 back of impeller 4, and adapted to rotate therewith, is a hardened steel washer 16, preferably having a ground or polished face tightly fitting the corresponding face of washer 15 under conditions of rotation of the impeller. The length of cylindrical bushing 14 is preferably such that it is sufficiently longer before installation, that the amount of compression of same when installed will force washer 15 against the face of washer 16, and form a tight seal without the pressure being excessive to the extent of producing an abnormal drag or frictional load upon operation of the pump. Where the bushing 14 is made from "neoprene" and is approximately one inch long and a half inch thick, a lengthwise compression of same in the range of one sixteenth to one eighth inch is satisfactory for most purposes. Sealing pressures up to eight or nine pounds per square inch are satisfactory for ordinary centrifugal pump use, although the invention is not limited to the use of those specific pressures.

The frictional component between the end of bushing 14 and the side of washer 15 will hold the latter against rotation under normal conditions so that a rotary seal will take place at the adjacent faces of washers 15 and 16. However, where the pump is to be used in cold weather for pumping water and the like, freezing of water or moisture in the pump may temporarily fasten washers 15 and 16 together so that they will tend to run as a unit with consequent wear on the end of bushing 14. To avoid difficulties of this nature, sleeve 12 may be provided with notches 17 (Figure 3) on its outer end, and washer 15 may be provided with inwardly projecting lugs 18 (Figure 4) adapted to loosely fit notches 17 under normal conditions of operation. This type of construction provides for positive operation, and at the same time facilitates the maintaining of a tight seal even when shaft 3, under conditions of operation, gyrates slightly. It should be noted at this point that the inner bore of washer 15 is slightly larger than the outer diameter of sleeve 12 so as to permit free oscillatory movement of same under conditions of gyration of shaft 3.

The use of sleeve 12 as such may be eliminated as shown in Figure 2 by extending casing 2a closer to shaft 3a and then boring recess 13a so that it is in the form of a groove opening only at its outer end. This construction produces a sleeve-like projection 19 which takes the place of the press fit sleeve 12 shown in Figure 1. The outer end of sleeve-like projection 19 may be provided with notches as described in connection with sleeve 12, and washer 15a may also be provided with inwardly projecting lugs as shown in Figure 4 so as to interengage with the notches in projection 19. The showing in Figures 1 and 2 is intended to diagrammatically illustrate constructions either with or without said notches and lugs. To provide better sealing action, the end of recess 13a may be provided with a plurality of corrugations 20, and the inner face of washer 15a may likewise be provided with a plurality of corrugations 21. The use of washer 16 may be eliminated if desired, and a satisfactory way of accomplishing this is to form the impeller 4a (Figure 2) of steel or a copper-nickel cast iron. The face of this impeller adjacent washer 15a, under these conditions, will be given a ground or polished finish adapted to contact directly with the corresponding face of washer 15a to form a tight seal therewith. Case hardening and heat treating of the impeller 4a may also be resorted to in order to provide a more efficient and wear resisting face in contact with washer 15a. Such procedure has the further advantage of making the impeller as a whole satisfactorily wear longer under conditions of pumping muddy fluids, sandy fluids, or the like. While washers 15 and 16, or the equivalent may be constructed with smoothly rounded edges, a better construction involves the use of square cut sharp edges since such make more difficult the entrance of foreign matter between the contacting faces of washers 15 and 16. The outer diameter of these two washers is also preferably the same so as to avoid the presence of shoulders at their junction which would be of aid to the ingress of foreign abrasive matter therebetween.

Where it is decided to place the impeller of a centrifugal pump closer to a bearing of the shaft to avoid or at least reduce gyration difficulties, or where it is decided to seal the crank case of a compressor against leakage of fluid along the crank shaft, a modified form of the present invention may be utilized. A conventional construction of this nature is shown in Figure 5 wherein the wall 22 of a pump casing, crank case, or the like is shown as equipped with a seal mechanism adapted to prevent leakage along shaft 3b which rotatably passes through a suitable tubular member 23 mounted in opening 24 of wall 22. Tubular member 23 which may serve either as an outlet member or a bearing for shaft 3b may be constructed in various ways, and one of the simplest involves the construction of this tubular member with a flange edge 25, one face of which is adapted to contact and grip a suitable washer-like gasket 26 against the side of wall 22. For convenience of anchoring the tubular member 23 to wall 22, it may be provided with external threads 27 on which a nut 28 and lock nut 29 are adapted to threadedly fit. In this construction, the tightening of nut 28 will clamp gasket 26 between wall 22 and the adjacent face of flange 25 of tubular member 23, and thus produce a sealed joint with nut 28 tightened in place. The tightening of lock nut 29 will fasten tubular member 23 against accidental disengagement. Where the present sealing mechanism is utilized, tubular member 23 is preferably made of oilless bronze, and its outer end 30 given a ground or polished finish. Shaft 3b may be held against endwise movement in any conventional manner, for instance, by a suitably located thrust bearing 41 or the like which, if desired, may be fastened directly to shaft 3b and rotate therewith. The seal is accomplished in the following manner. A ring member 31 provided with set screws 32 is mounted on shaft 3b at desired location and clamped in place by means of said set screws. This clamping may be accomplished merely by frictional contact with shaft 3b, or the latter may be provided with shallow recesses 33 into which the ends of said screws 32 may be tightened. Mounted on the outer face of ring member 31, for instance by screws 34 or other conventional means, is an extending sleeve member 35. A washer 36 which may be constructed of various materials, and preferably of hardened or stainless steel, is provided with a ground or polished face adapted to abut and tightly fit end 30 of tubular member 23. This washer is preferably provided with outwardly projecting lugs 37 (Figure 7) which loosely fit grooves 38 in the end of sleeve member 35. This construction causes washer 36 to rotate in unison with ring member 31 so that the rotary bearing surface of the seal will be on end 30 of tubular member 23. Between washer 36 and ring member 31 is mounted a washer 39, and intermediate of washers 36 and 39 is a resilient cylindrical bushing 14 which may be of soft rubber, "neoprene," or the like. Screws 40 threadedly engage and pass through ring member 31 in axial direction, and the point end of said screws bear against the outer face of washer 39. With the seal mechanism assembled and cylindrical bushing 14 in place, the tightening of screws 40 moves washer 39 to the right as viewed in Figure 5, and compresses cylindrical bushing 14 which is held on all four sides, thus causing this bushing to grip shaft 3b and form a tight seal therewith as well as with the other surfaces which it contacts. At the same time, washer 36 is pressed against outer end 30 of tubular member 23 to form the rotary contact surface of the seal. The degree of tightness of the rotary contact surface which preferably fits substantially perfectly throughout, varies with the tightening of screws 40. Thus with a difficult to hold fluid, screws 40 may be tightened a little more than usual to provide a more effective seal. With this type of construction the cylindrical bushing 14 rotates with the shaft, while in the constructions shown in Figures 1 and 2, the cylindrical bushing 14 is shown as held in fixed position. The sleeve 35 (Figure 5) acts as an outer retainer for cylindrical bushing 14, while in Figures 1 and 2 this bushing is illustrated as free from this outward expansion restraining influence. The invention, however, is not limited to that specific construction since it is obvious that the cylindrical bushing 14 could be made slightly larger in outer diameter so as to fully fit recess 13 or 13a without varying from the principles of the present invention.

Other modes of applying the principle of my invention may be employed instead of those explained, change being made as regards the mechanism herein disclosed, provided the means stated by the following claim or the equivalent of such stated means be employed.

I therefore particularly point out and distinctly claim as my invention:

In a seal to prevent escape of fluid along a shaft, the combination with a rotary shaft and a stationary member through which said shaft extends, of a pair of continuous and full face metal seal members in running contact with each other, a sleeve type member cooperating with one of said seal members in manner permitting endwise movement of the latter relative to said sleeve type member, an elongated substantially cylindrical, continuous, and resilient bushing substantially concentric with said sleeve type member and in contact with the back face of said seal member cooperating with said sleeve type member, means for supporting the opposite end of said resilient bushing so as to place same under endwise compression and force said pair of metal seal members into a running contact seal with each other, even under moderate gyration or end play of said shaft, and corrugations on the faces of said seal member and supporting means which are in contact with the ends of said resilient bushing to facilitate elimination of by-pass leakage of fluid, said corrugations being substantially concentric with said shaft.

ROBERT B. YAUCH.